US005490024A

United States Patent [19]

Briggs et al.

[11] Patent Number: 5,490,024

[45] Date of Patent: Feb. 6, 1996

[54] DISK CLAMP HAVING AN ANNULAR SECTION OF INCREASED RIGIDITY

[75] Inventors: Christopher Briggs, Colorado Springs, Colo.; Jia-Kuen J. Lee, San Jose, Calif.

[73] Assignee: Conner Peripherals, Inc., San Jose, Calif.

[21] Appl. No.: 148,385

[22] Filed: Nov. 8, 1993

[51] Int. Cl.[6] .................... G11B 25/04

[52] U.S. Cl. .................... 360/99.12; 360/98.08; 369/270

[58] Field of Search .................... 360/99.12, 98.08, 360/98.01, 97.01; 369/270, 271

[56] References Cited

U.S. PATENT DOCUMENTS

| | | | |
|---|---|---|---|
| 3,768,083 | 10/1973 | Pejcha | 360/97.01 |
| 4,224,648 | 9/1980 | Roling | 360/99.12 |
| 4,367,503 | 1/1983 | Treseder | 360/97.03 |
| 4,458,282 | 7/1984 | Mui et al. | 360/99.12 |
| 4,561,035 | 12/1985 | McDorman et al. | 360/99.12 |
| 4,835,637 | 5/1989 | Mach et al. | 360/98.01 |
| 4,893,205 | 1/1990 | Hoppe et al. | 360/98.01 |
| 4,933,785 | 6/1990 | Morehouse et al. | 360/99.12 |
| 5,031,061 | 7/1991 | Hatch | 360/98.08 |
| 5,101,306 | 3/1992 | Johnson | 360/99.12 |
| 5,136,450 | 8/1992 | Moir | 360/99.12 |
| 5,148,338 | 9/1992 | Frugé | 360/98.01 |

FOREIGN PATENT DOCUMENTS

| | | | |
|---|---|---|---|
| 55-157166 | 12/1980 | Japan | 360/99.08 |
| 56-029842 | 3/1981 | Japan | 360/98.01 |
| 60-136055 | 7/1985 | Japan | 360/99.12 |
| 61-194686 | 8/1986 | Japan | 360/99.08 |
| 63-002183 | 1/1988 | Japan | 360/99.12 |
| 63-074164 | 4/1988 | Japan | 360/98.01 |

OTHER PUBLICATIONS

"Magnetic Disk Assembly", Dickie et al., IBM Technical Disclosure Bulletin, vol. 16, No. 11, p. 3763, Apr. '74.

"Eliminating Clamp–Induced Stresses In Disk Stacks", Beye, IBM Technical Disclosure Bulletin, vol. 20, No. 10, p. 4107, Mar. '78.

*Primary Examiner*—Robert S. Tupper
*Assistant Examiner*—Craig A. Renner
*Attorney, Agent, or Firm*—Fliesler, Dubb, Meyer & Lovejoy

[57] ABSTRACT

A disk drive having a read/write head flying at extremely low flying heights, the drive including a disk clamp for clamping one or more disks within the disk drive, with the clamp exerting a substantially uniform pressure at the circular line of contact between the clamp and the disk. The disk clamp includes a raised circular wall around an outer radius of the clamp, which wall is formed as part of and integrally with the rest of the clamp. The wall serves to increase the structural rigidity of the clamp in a single axial section of the clamp, thereby providing a "stress barrier" to the transmission of localized stresses from the screw points. Thus, the pressure exerted by the clamp on the disk is evenly distributed around the entire clamp, and the distortion normally occurring at the inner diameter of the disk with conventional disk clamps is greatly reduced.

17 Claims, 4 Drawing Sheets

66 64 62 60 66 64 60 62
66 64 62 60 66 64 60 62
66 64 62 60 66 64 60 62

DISK CLAMP HAVING AN ANNULAR SECTION OF INCREASED RIGIDITY

BACKGROUND OF THE INVENTION

1. Field of the Invention

The present invention relates to a data storage device, and more particularly, to a structure for securing one or more disks within a disk drive, the structure exerting a clamping force which is substantially uniformly distributed around the disk.

2. Description of the Related Art

Conventional disk drives for use in work stations, personal computers, and portable computers are required to provide a large amount of data storage within a minimum physical space. In general, Winchester type disk drives operate by positioning a read/write transducing head over respective tracks on a rotating magnetic storage disk. Positioning of the head over the tracks is accomplished by an actuator coupled to control electronics, which control the positioning of the actuator and the read/write functions of the heads.

Greater demands are being placed on disk drives by (1) the use of multi-user and/or multi-tasking operating systems, (2) work stations which provide an operating environment requiring the transfer of large amounts of data to and from a hard disk and/or large numbers of disk accesses to support large application programs or multiple users, (3) the present popularity of notebook and laptop computers, and (4) the continuing trend toward higher performance microprocessors. All such systems require a hard drive having high-capacity storage capability, while occupying a minimum of space within the host computer. In order to accommodate these demands, there is a need to produce a smaller hard disk drive which at the same time has an increased storage capacity. For such applications, single drive capacities on the order of hundreds of megabytes are common.

An important determinant in the storage capacity of a disk drive is the flying height of the transducing heads above the rotating disk. In conventional Winchester-type hard drives, once the storage disk achieves a certain angular velocity after start-up of the drive, a cushion of circulating air above the surface of the disk forces the head up off the surface of the disk to thereby achieve a flying height. Having very low flying heights offers several advantages, primary among them is that flying the head very close to the disk surface allows for a high data bit density (i.e., the number of data bits per inch on a data track). The greatest data bit density would be obtained where the transducing head rides in contact with the storage disk. However, the contact of the head and head slider with the disk surface would result in damage to the head and/or disk in an unreasonably short period of time. Thus, there has been an industry wide push to decrease the height at which read/write heads are maintained over the disk surface without actually riding in contact with the disk surface. In the 1960's flying heights were commonly about 100 microinches (μ"). At present, technological advances in read/write heads and disk drive design have allowed the reduction of flying heights to around 4μ" in commercially viable disk drives.

When a head flies over a disk, the flying height does not remain constant, but rather tends to fluctuate slightly above and below the normal flying height. At lower flying heights, a variation in the fly height may cause the head to randomly contact the disk surface. This situation is referred to as intermittent contact. Presently, flying heights have been reduced to the point where intermittent contact with the disk surface has become an important consideration in the tribology of the head/disk interface. Repeated intermittent contact between the head and a particular location on the disk surface can cause damage to the head and/or disk, and may cause drive failure in an unreasonably short period of time.

In contemporary disk drives, such as the 2½ and 3½ inch form factor drives, special attention must be paid to the structure and method used to clamp the disk or disks within the drive. Due to a combination of factors, distortion in the disk caused by conventional disk clamps has become a significant problem near the inner diameter of the disk. One reason distortion has become a problem relates to the present flying heights of the read/write head over the disk. With the head flying so close to the disk, even slight distortions in the disk surface can cause repeated intermittent contact and drive failure in a short period of time. A second reason why distortion has become a problem relates to the thickness of the disk. In previous generation disk drives, such as the 5¼ inch and larger form factor drives, the disks used were relatively thick, and thus were able to withstand the clamping force of the disk clamp without significant distortion. However, in an effort to minimize the height of 3½ inch and smaller form factor drives, the thickness of the disks used has been reduced to the point where distortion of the disk by the clamp is a potentially significant problem.

Another reason why disk clamps pose significant disk distortion problems relates to the manner in which the clamp secures a disk within the disk drive. In conventional drives, the disk is provided on a cylindrical hub which is affixed to the rotor of the spin motor. A clamp is provided on top of the hub, and has a larger radius than the hub such that an outer circumferencial portion of the clamp is in contact with the disk. A plurality of screws fit through holes around an inner circumferencial portion of the clamp, and into threaded bores in the hub. Conventionally, anywhere from three to eight screws are-used in this type of clamp configuration. In smaller disk drives which do not require a large clamping force, a clamp having a single screw through the center of the clamp may be used. When the screws are tightened, the pressure at the screws is transferred to the outer circumferencial portion of the clamp, which contacts the disk to secure the disk or disks in place. The screws must be secured under a considerable force in order to prevent any slippage, radial movement or tilting of one or more disks. Even a very slight radial movement or tilting of a disk within a drive could result in mechanical off-tracking of the head with respect to the disk, which off-tracking could result in read/write errors.

Ideally, the force exerted by the disk clamp at the circular line of contact defined between the clamp and disk should be uniform around the entire line of contact. However, in fact the concentrated force of the screws securing the clamp to the hub result in localized stresses at points around the line of contact located radially outward from the screws. These localized stresses tend to distort the disk. The stresses are greatest near the inner diameter of the disk, and tend to dissipate toward the outer diameter of the disk, so as to create distortion in the disk similar to patterns 10 on FIG. 1.

Attempts have been made in the past to reduce the localized stresses transmitted to a disk in one of two ways. The first way was to use a more rigid material. Conventionally, disk clamps have been formed from aluminum. However, by using, for example, a clamp machined out of steel, it was hoped that the higher rigidity would more uniformly distribute the stresses due to the concentrated screw force. The second way was to use a thicker disk clamp, thereby adding to the rigidity of the clamp. Upon testing, both attempts failed to significantly reduce the distortion in the disk. It is believed that these designs failed because of the uniform rigidity throughout the clamp. While the uniformly higher rigidity in the clamp was effective to a small degree in distributing stress, contact areas between the disk and clamp radially outward from the screw points still exhibited a greater contact pressure than contact areas radially outward from positions between two screws. The rigidity of a uniformly rigid clamp could be increased to the point where localized stresses at the screw points were uniformly distributed. However, such clamps are either not economically feasible or too cumbersome to fit within a disk drive.

At the inner diameter of the disk, the peak to valley distortion of the disk due to non-uniform clamping force may be as high as 10 to 20 microns. Since read/write heads are presently flying at normalized surface heights of less than approximately 4μ", it is clear that flying the head near the inner diameter of the disk will result in severe and repeated intermittent contact of the head with the high points of the disk, which may result in damage to the head and/or disk and drive failure in an unreasonably short period of time.

SUMMARY OF THE INVENTION

It is therefore an object of the present invention to provide a disk drive capable of reliable and durable operation at extremely low flying heights.

It is a further object of the present invention to provide a disk drive wherein distortion at the inner diameter of the disk is severely reduced.

It is a still further object of the present invention to provide a clamp for securing a disk within a disk drive in a fixed relation to the hub without causing distortion of the disk.

These and other objects are accomplished by the present invention, which relates to a disk drive including a read/write head flying at extremely low flying heights. The drive includes a disk clamp for clamping one or more disks within the disk drive, with the clamp exerting a substantially uniform pressure at the circular line of contact between the clamp and the disk. The disk clamp includes a raised circular wall around an outer radius of the clamp, which wall is formed as part of and integrally with the rest of the clamp. The wall serves to increase the structural rigidity of the clamp in a single axial section of the clamp, thereby providing a "stress barrier" to the transmission of localized stresses from the screw points. That is, the wall is provided to prevent the localized stresses created at the screw points from being transmitted to the disk. The wall is positioned at a diameter which is larger than the diameter of the clamping screws, but smaller than the diameter of the line of the contact defined between the clamp and disk. Positioned as such, the wall is able to evenly distribute the localized stress emanating from the screws, so that the pressure of the clamp on the disk at the line of contact is substantially uniform around the entire clamp. Thus, the distortion normally occurring at the inner diameter of the disk with conventional disk clamps is greatly reduced.

BRIEF DESCRIPTION OF THE DRAWINGS

The invention will now be explained with reference to the Figures in which.

Figure 4:
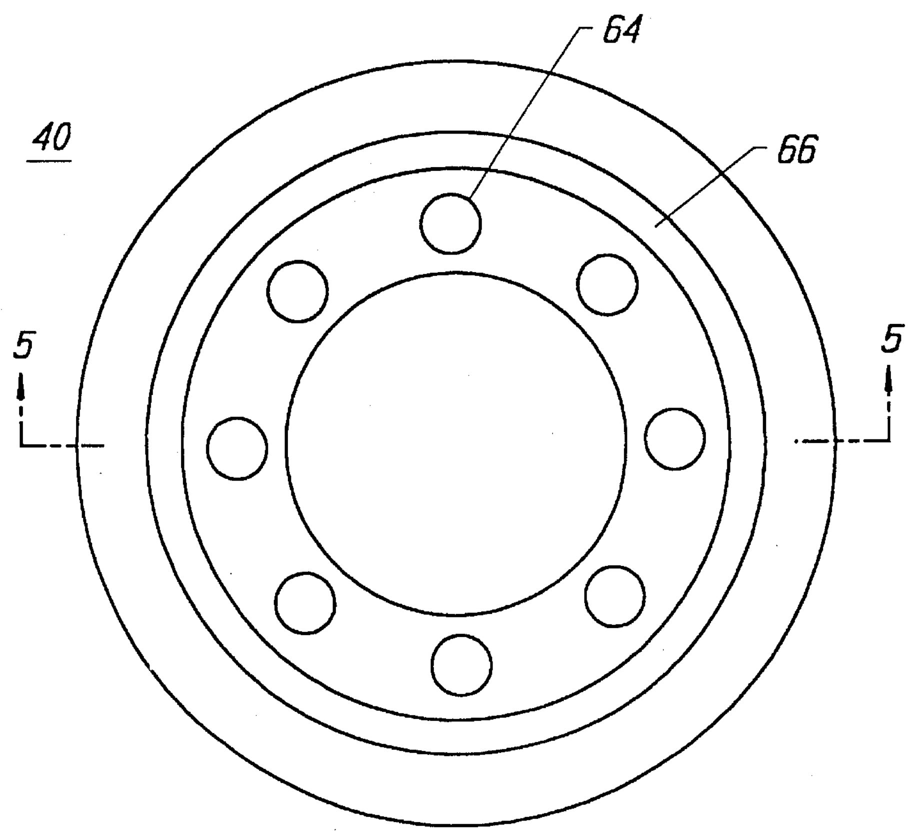
FIG. 4 is a top view of a disk clamp according to the present invention.
Figure 5A:
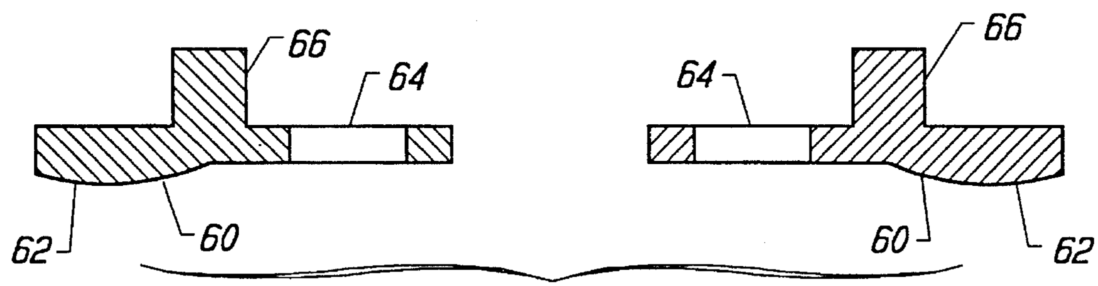

FIG. **5*a* is a cross-sectional view of a disk clamp through line 5—5 in FIG. 4**;

FIG. **5*b* is an alternative embodiment of the disk clamp shown in FIG. 5*a*;**

FIG. **5*c* is a further embodiment of the disk clamp shown in FIG. 5*a*;**

Figure 6A:
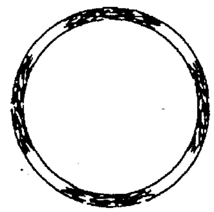
Figure 6B:
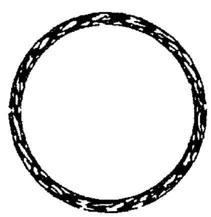

FIG. **6*a* represents a test result showing the relative pressure distribution around a conventional disk clamp; and FIG. 6*b*** represents a test result showing the relative pressure distribution around a disk clamp according to the present invention.

DETAILED DESCRIPTION OF A PREFERRED EMBODIMENT

The invention will now be described with reference to FIGS. **1–5*c***, which relate to a disk drive with a novel disk clamping design. In a preferred embodiment of the present invention, the clamp design may be used with 2½ and 3½ inch form factor disk drives. However, it is understood that the present invention may operate with disk drives of various sizes and designs, as well as other types of data storage devices, such as optical and laser storage systems.

Figure 1:
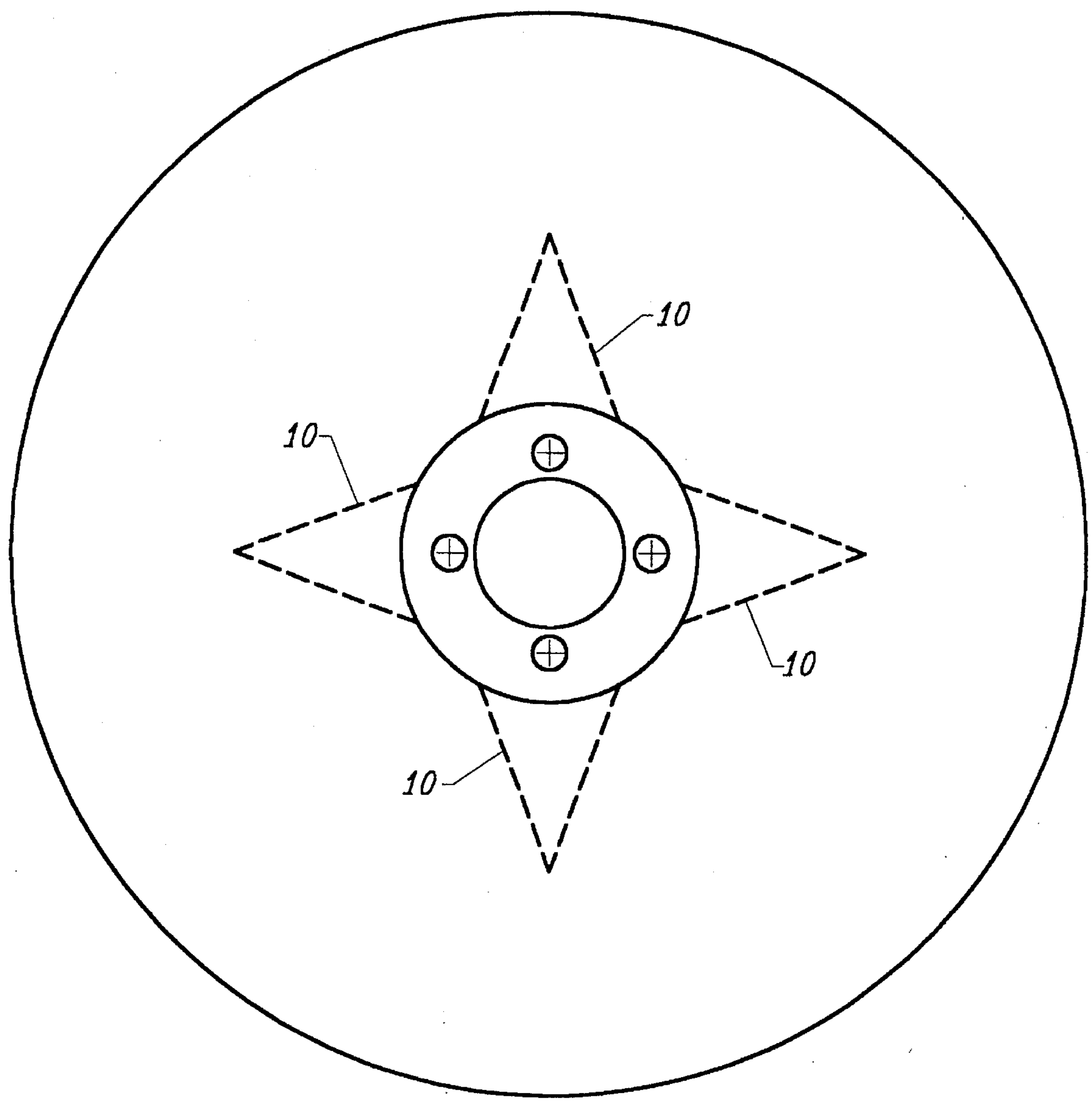
FIG. 1 is a prior art top view of a disk showing a distortion of the disk due to the force of the clamping screws.
Figure 2:
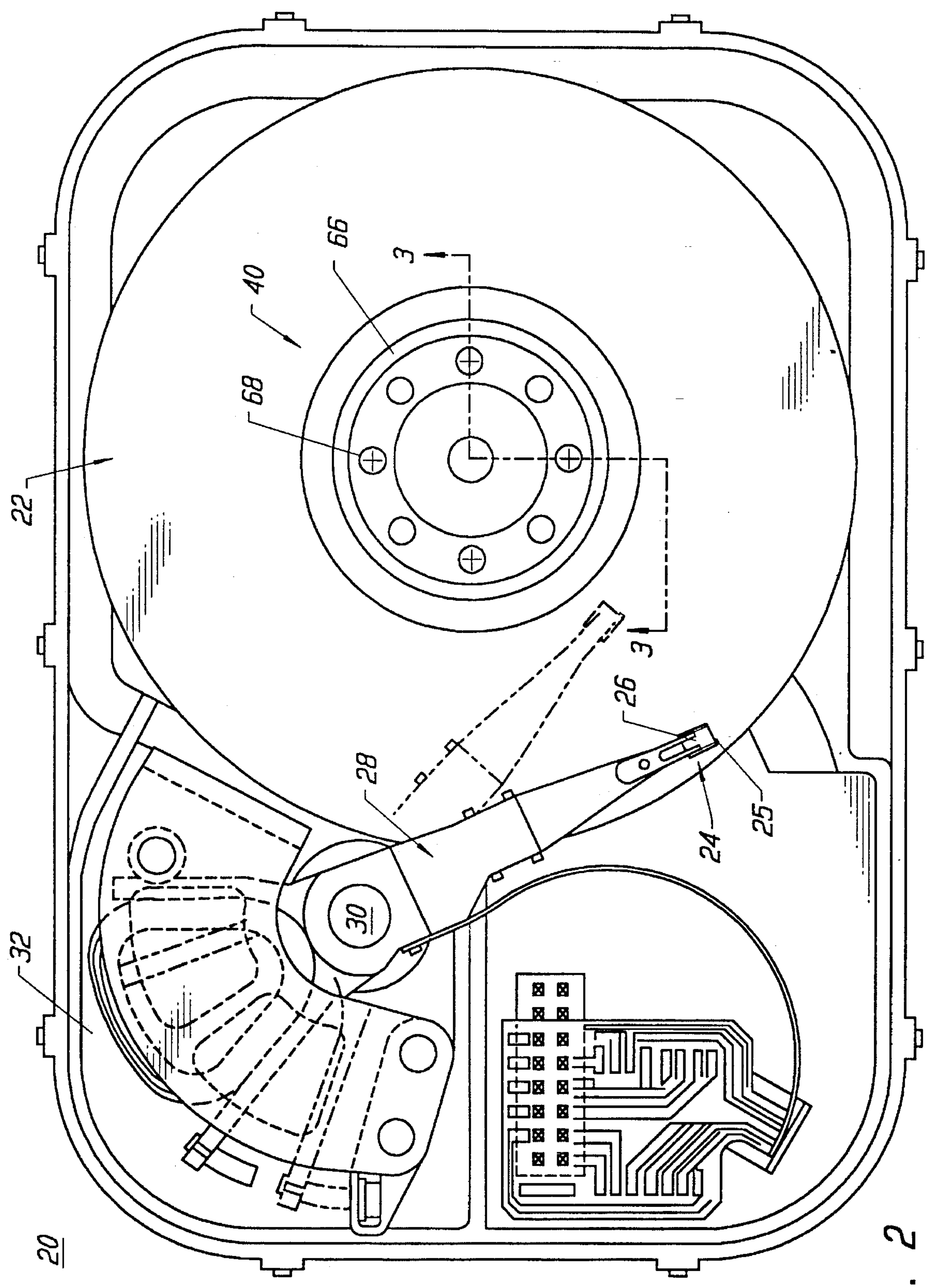
FIG. 2 is a top view of a disk drive according to the present invention.

Referring now to FIG. 2 there is shown a disk drive 20 including a storage disk 22 and a read/write head 24. Read/write head 24 includes a transducer 25 mounted to a slider 26. The slider 26 is in turn supported on an actuator arm 28. Transducer 25 may be a conventional inductive transducing element, or in an alternative embodiment, may be a magneto-resistive (MR) transducing element. Actuator arm 28 is provided to pivot around pin 30 by voice coil motor 32 in response to control signals received from a printed circuit board (not shown). As is known in the art, during operation of the drive 20, disk 22 is rotated by a spin motor 44 (FIG. 3) and actuator arm 28 pivots read/write head 24 across the surface of the disk so that data is transferred between the read/write head 24 and the disk 22 in a plurality of concentric data tracks. Slider 26 is provided to fly a very small distance above the surface of disk 22 as disk 22 rotates. In a preferred embodiment, the head may have a flying height between 1–4μ", and optimally about 2.5μ".

Figure 3:
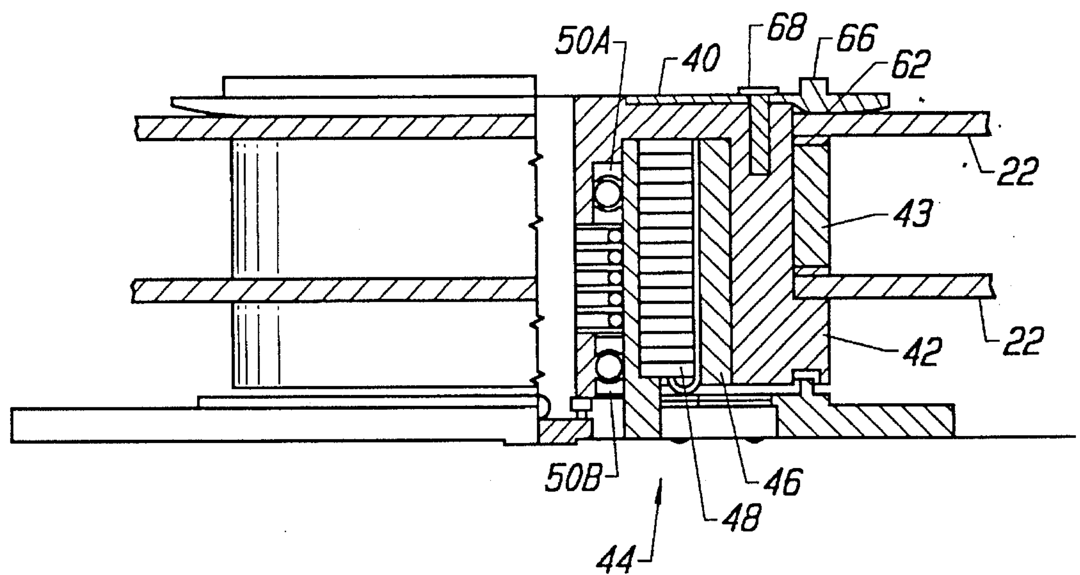
FIG. 3 is a cross-sectional view through line 3—3 in FIG. 2.

As shown in FIGS. **2–5*c*, disk drive 20 further includes a disk clamp 40 for clamping the disks 22. In the embodiment of FIG. 3, two disks 22 are shown. It is understood, however, that the present invention may utilize one or more disks 22. In general, disks 22 fit over a hub 42, and are separated and held in parallel relation to each other by means of an annular spacer 43. The hub is adjacent to a spin motor generally shown at 44. The spin motor is comprised of a magnetic rotor 46 and stationarily mounted stator windings 48. The hub 42 is affixed to the rotor 46, with the hub 42 and rotor 46 both rotatably supported on bearings 50*a* and 50*b* to allow rotation of the hub and rotor as a singular unit. As is known in the art, commutation of an electrical current through windings 48 will cause the rotor 46 to rotate, thus rotating disks 22. It is understood to be within the scope of the invention that various other structures may be substituted for the structures described above for supporting and rotating the disks 22** as is known in the art.

With specific regard to the disk clamp 40, the clamp is preferably an annular member comprised of aluminum or a comparably rigid and durable material, with an inner diameter of approximately 0.6 inches and an outer diameter of approximately 1.3 inches. These dimensions, and those set forth below, are for clamps used in 3½ inch form factor disk drives. It is understood that these dimensions will vary in disks drives of other sizes. FIG. 5*a*, which is a cross-sectional view through line 5—5 of FIG. 4, shows a rounded lower surface 60 at an outer circumferencial section of the clamp. In a preferred embodiment, the surface 60 may be an arc rounded about a radius of approximately 0.23 inches. The rounded surface 60 has a portion 62 (FIGS. 3 and 5*a*) in contact with the upper surface of the top disk 22. The contact portion 62 around the entire clamp 40 generally defines a circular line of contact having a diameter of approximately 1.2 inches.

The line of contact defined between the clamp and disk should be at substantially the same diameter as the line of contact defined between the disks 22 and the spacer 43. In a preferred embodiment of the present invention, the disk spacer 43 defines a line of contact with the disks approximately half-way between the inner and outer diameters of the spacer. Thus, the disk clamp is preferably configured to define a line of contact which aligns at the same diameter as the spacer line of contact. In embodiments having multiple spacers, each line of contact defined between a disk and spacer should be at substantially the same diameter as the disk clamp line of contact. Unless the line of contact between the clamp and disk and the disks and spacers are each aligned with each other at substantially the same diameter, a disadvantageous radial moment will be created within the disks tending to cause a cone-like deformation in the disks.

Clamp 40 may further include a plurality of screw holes 64 which align with threaded bores in the hub 42. As is readily understood, screws 68 (FIGS. 2 and 3) fit through holes 64 into the hub 42 to secure the clamp 40 and disks 22 within the drive 20. As described in the Background of the Invention Section, screws 68 must be tightened under a considerable force to prevent any slippage or tilting of disks 22. In a preferred embodiment, for a 3½ inch form factor disk drive, the screws are torqued to about 4.2 pound-inches. The screw holes may be evenly spaced around a circumference of the clamp 40, and include center points lying on circle having a diameter of approximately 0.77 inches. In the embodiment shown in FIG. 4, the clamp 40 includes eight screw holes 64, but the number of screw holes may vary in alternative embodiments. It is further contemplated that the disks 22 may be secured within the drive by using less screws 68 than there are screw holes 64.

Figure 5B:
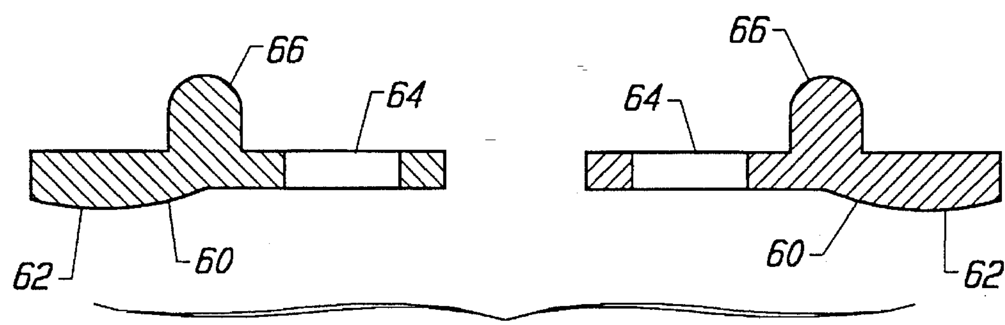
Figure 5C:
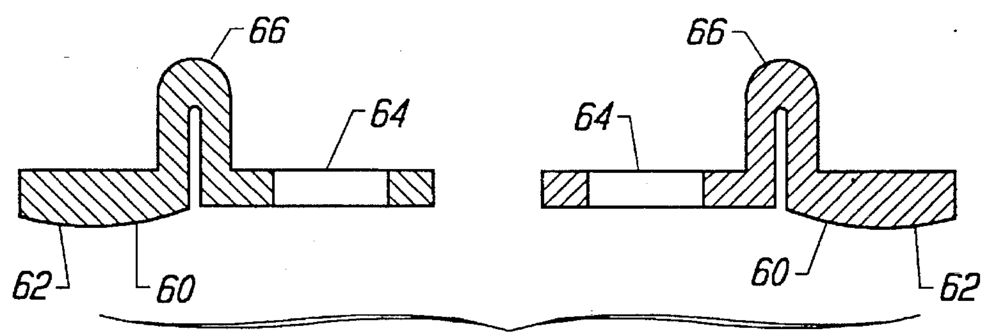

According to the present invention, the clamp 40 may additionally include an elevated circular wall 66 to act as a stress barrier. The wall 66 is provided at a diameter between the line of contact defined by contact portion 62 and the diameter at which the screw holes 64 are located. The wall 66 may preferably have a height of about 0.07 inches, and inner and outer diameters of approximately 0.95 inches and 1.07 inches, respectively, thus defining a wall thickness of approximately 0.12 inches. The wall 66 is formed as part of and integrally with the clamp 40 for the purpose of adding structural rigidity to an axial section of the clamp 40. Although the wall 66 is shown as having a substantially rectangular configuration around the clamp, it is understood that the wall may be configured differently in other embodiments. For example, in an alternative embodiment shown in cross-section in FIG. 5*b*, the wall may be an elevated section with rounded edges. In a further embodiment of the present invention shown in cross-section in FIG. 5*c*, the wall 66 may be formed by creating a fold in clamp 40. As would be appreciated by those skilled in the art, further configurations of the wall 66 are possible. The embodiment shown in FIG. 5*c* offers an advantage that it is easily and inexpensively manufacturable.

The effect of wall 66 is to act as a stress barrier by increasing the rigidity of a single axial section of the clamp relative to the rest of the clamp. As previously explained, due to localized stresses at the screw points, conventional disk clamps cause higher stresses and deformation in the disk at the sections located radially outward from the screw points. However, wall 66 acts as a stress barrier, such that localized stresses emanating from the screw points reach the wall 66 and are uniformly distributed around the wall. Thus, sections of the clamp at a diameter outside of the wall 66 receive a uniform pressure distribution. This allows clamp 40 to exert a relatively uniform pressure on disk 22 around the entire periphery of the clamp, and distortion of the disk is substantially avoided.

Tests were conducted comparing a conventional disk clamp to a disk clamp according to the present invention. In the tests, a pressure sensitive sheet, such as carbon paper, and a test sheet to pick up the markings made by the pressure sensitive sheet, were inserted between disk and clamp around the line of contact of the disk and clamp. Four screws were then tightened around the clamps under the same torque. The pressure sensitive carbon paper made markings on the test sheet which were proportionate to the amount of pressure exerted on the pressure sensitive sheet. FIG. 6*a* shows the results obtained with the conventional disk clamp. The heavier markings are located radially outward from the four screw points. As can be seen, there is greater pressure exerted on the disk radially outward from the screw points. FIG. 6*b* shows the results obtained using a disk clamp according to the present invention. The pressure distribution around the line of contact is relatively uniform. FIGS. 6*a* and 6*b* are not the actual test results obtained in the above-described tests, but are accurate reproductions thereof.

Thus, the clamp according to the present invention was shown to evenly distribute the clamping forces generated at the screw points to thereby greatly prevent distortion of the disk. By preventing distortion of the disk, the head 24 may fly near the inner diameter of the disk at extremely low flying heights, for example 2μ", without repeated intermittent contact of the head with the same locations on the disk. Thus, damage to the head 24 and/or disk 22 may be avoided and the life of the disk drive prolonged.

Although the invention has been described in detail herein, it should be understood that the invention is not limited to the embodiments herein disclosed. For example, it is understood that the specific size limitations recited with respect to the various dimensions of the clamp 40 may be varied and still be within the scope of the invention. These dimensions may vary with the limitation that the diameter at which the wall 66 is located must be larger than the diameter at which the screw points are located and smaller than the diameter of the line of contact defined between the clamp and disk. Various other changes, substitutions and modifications may be made to the present invention by those skilled in the art without departing from the spirit or scope of the invention as described and defined by the appended claims.

We claim:

1. A disk drive, comprising:

a housing;

storage media within said housing for storing data;

a transducer for transferring data to and from said storage media;

an annular clamp adjacent to said storage media for clamping said storage media within said housing, said clamp having a first annular section, and a second annular section located radially outward from said first annular section, said second annular section including a substantially planar top surface and a substantially arcuate bottom surface, said substantially arcuate bottom surface contacting a storage medium of said storage media, and said clamp having a third annular section located radially between said first and second annular sections, said third annular section having increased rigidity relative to said first and second annular sections;

a plurality of holes provided around said first annular section of said clamp for receiving screw means therethrough to secure said storage media in a fixed relation to said transducer, said third annular section preventing localized stresses emanating from said plurality of holes and screw means from being transmitted into said storage media;

actuator means for positioning said transducer with respect to said storage media; and control electronics for controlling said transfer of data and for controlling said positioning of said actuator means.

2. A disk drive as recited in claim 1, wherein said annular third section comprises an elevated wall concentric with an inner diameter of said clamp, said wall formed as part of and integrally with said clamp and having a greater height than said first and second annular sections of said clamp.

3. A disk drive as recited in claim 2, wherein said wall is formed by a protruding fold in said clamp.

4. A disk drive as recited in claim 2, wherein said wall has a substantially rectangular cross section with a height of approximately 0.07 inches and a radial thickness of approximately 0.12 inches.

5. A disk drive as recited in claim 2, wherein said wall has a top portion with a substantially rounded cross section.

6. A disk drive as recited in claim 1, further comprising:

at least one spacer, one spacer of said at least one spacer provided for separating each pair of adjacent storage media of said storage media, a line of contact between said clamp and said storage media defining a diameter which is substantially the same as each diameter defined by the line of contact between said at least one spacer and each of said storage media.

7. A disk drive as recited in claim 1, wherein said clamp is comprised of aluminum.

8. A disk drive as recited in claim 1, wherein said transducer is mounted on a fluid bearing means, said fluid bearing means provided for supporting said transducer to fly over said storage media at a height greater than or equal to one microinch (1μ") and less than or equal to four microinches (4μ").

9. A disk drive as recited in claim 1, wherein said transducer is mounted on a fluid bearing means, said fluid bearing means provided for supporting said transducer to fly over said storage media at a height of two and one-half microinches (2.5μ").

10. A disk clamp for clamping one or more disks within a disk drive, comprising:

a first annular section;

a second annular section located radially outward from said first annular section, said second annular section including a substantially planar top surface and a substantially arcuate bottom surface, said substantially arcuate bottom surface provided for contacting an uppermost disk of the one or more disks;

a third annular section located radially between said first and second annular sections, said third annular section having increased rigidity relative to said first and second sections of the clamp; and a plurality of holes provided around said first annular section of the clamp for receiving screw means therethrough to secure the one or more disks within the disk drive, said third annular section preventing localized stresses emanating from said plurality of holes and screw means from being transmitted into the one or more disks.

11. A disk drive as recited in claim 10, wherein said third annular section comprises an elevated wall of greater height than adjacent sections of the clamp and being concentric with an inner diameter of the clamp, said wall formed as part of and integrally with the clamp.

12. A disk drive as recited in claim 11, wherein said wall has a substantially rectangular cross section with a height of approximately 0.07 inches and a radial thickness of approximately 0.12 inches.

13. A disk clamp for clamping one or more disks within a disk drive, comprising:

a first annular section including a plurality of holes for receiving screw means therethrough to secure the one or more disks within the disk drive;

a second annular section located radially outward from said first annular section, said second annular section including a substantially planar top surface and a substantially arcuate bottom surface, said substantially arcuate bottom surface provided for contacting an uppermost disk of the one or more disks; and a third annular section provided radially between said first and second annular sections, said third annular section including an elevated, annular wall of greater height and rigidity than said first and second annular sections of the clamp.

14. A disk clamp as recited in claim 13, wherein said wall is formed by a protruding fold in the clamp.

15. A disk clamp as recited in claim 13, wherein the clamp is comprised of aluminum.

16. A disk clamp as recited in claim 13, wherein said wall has a substantially rectangular cross section with a height of approximately 0.07 inches and a radial thickness of approximately 0.12 inches.

17. A disk clamp as recited in claim 13, wherein said wall has a top portion with a substantially rounded cross section.

* * * * *